United States Patent [19]
Knudsen et al.

[11] 3,986,720

[45] Oct. 19, 1976

[54] TURBINE SHROUD STRUCTURE

[75] Inventors: Bruce E. Knudsen, Cincinnati, Ohio; Charles E. Corrigan, Tempe, Ariz.

[73] Assignee: General Electric Company, Cincinnati, Ohio

[22] Filed: Apr. 14, 1975

[21] Appl. No.: 567,532

[52] U.S. Cl. .................................... 277/26; 415/136
[51] Int. Cl.[2] ...................... F02F 11/00; F01D 1/04
[58] Field of Search ................. 415/12, 136; 277/26

[56] References Cited
UNITED STATES PATENTS

| | | | |
|---|---|---|---|
| 1,708,044 | 4/1929 | Baumann | 277/26 |
| 2,863,634 | 12/1958 | Chamberlain et al. | 277/26 |
| 2,962,256 | 11/1960 | Bishop | 277/26 |
| 3,146,992 | 9/1964 | Farrell | 277/26 |
| 3,514,112 | 5/1970 | Pettengill | 277/26 |

Primary Examiner—Robert I. Smith
Attorney, Agent, or Firm—Dana F. Bigelow; Derek P. Lawrence

[57] ABSTRACT

The structure which supports a rotor-surrounding shroud is composed of a material exhibiting a low coefficient of thermal expansion at low temperatures and a high coefficient of thermal expansion at higher temperatures. In this way, low alpha characteristics persist during periods of low temperature operation to provide large cold clearances and acceptable clearances during transient operation, while high alpha characteristics persist during periods of high temperature operation to provide close clearance control at maximum and part-power, steady-state operating conditions. The two-alpha material also finds use with other relatively rotating parts having close clearance relationship therebetween, such as in the stationary portion of a seal structure.

6 Claims, 4 Drawing Figures

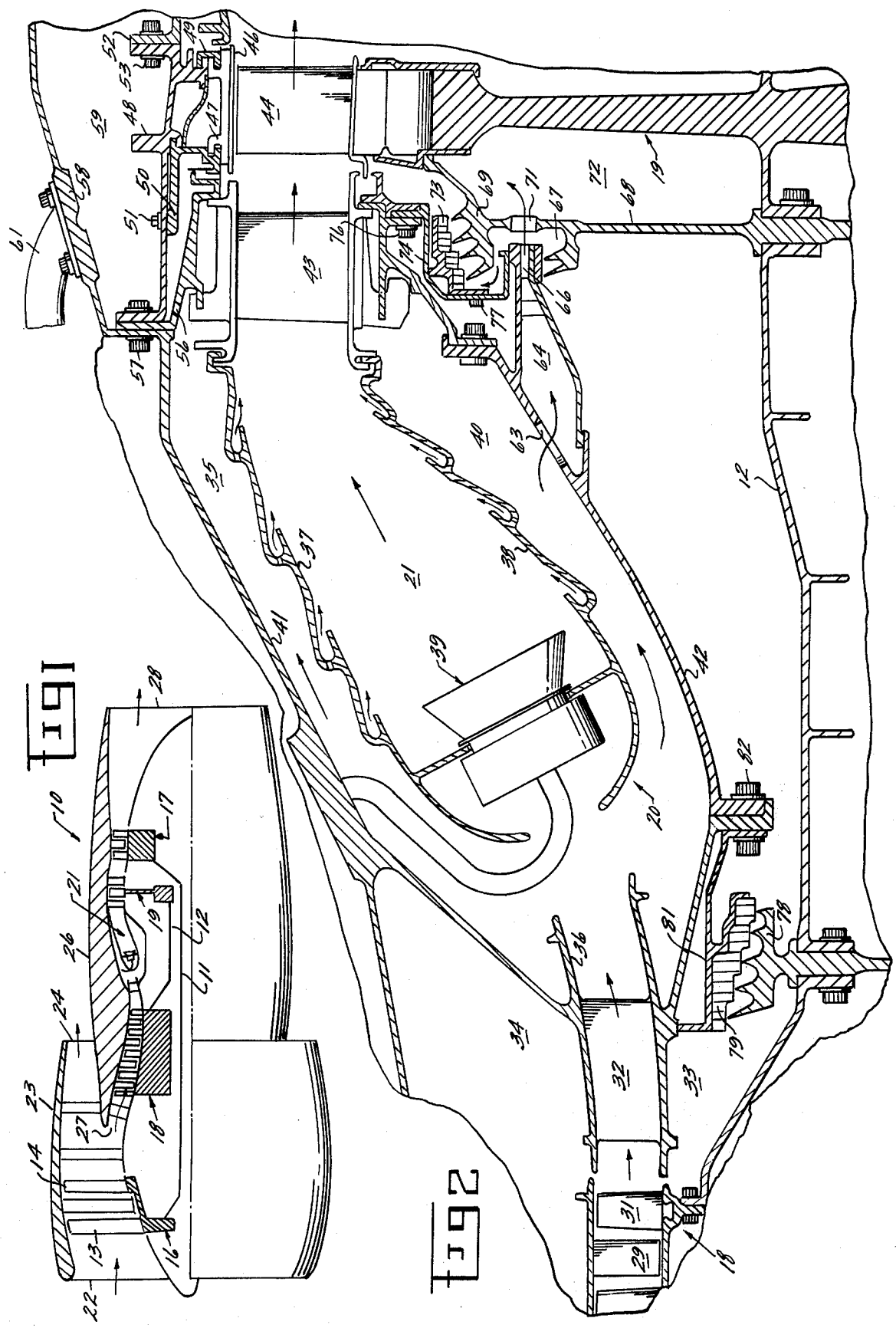

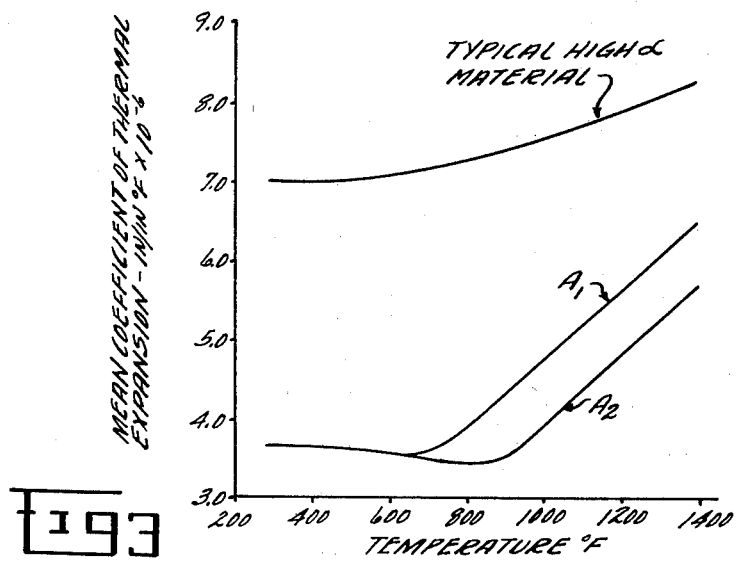
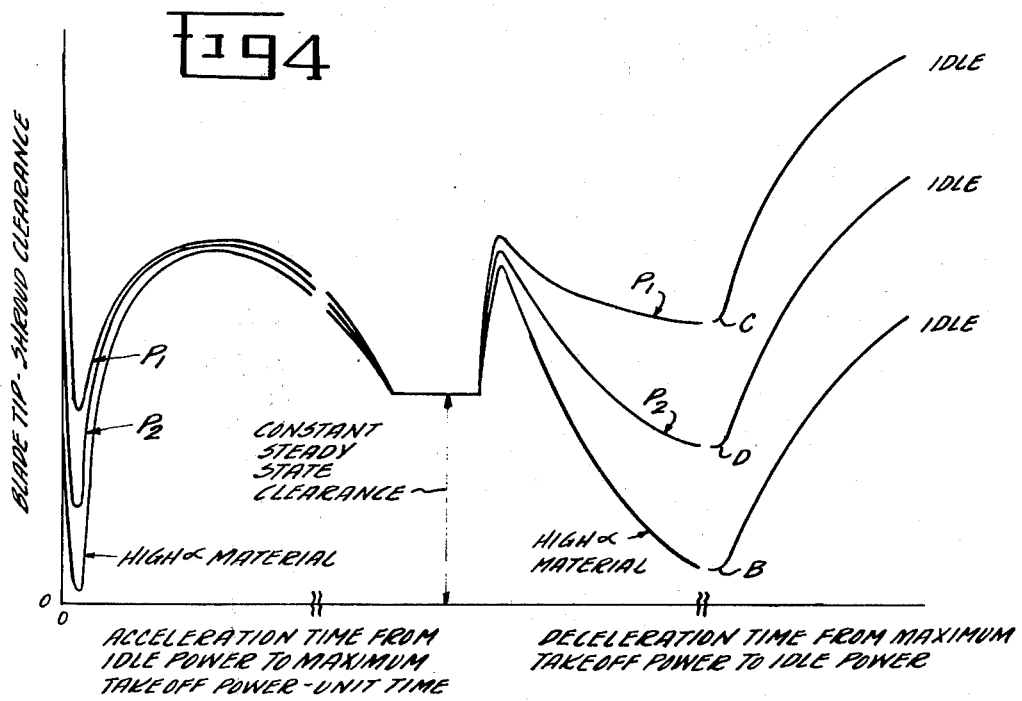

TURBINE SHROUD STRUCTURE

BACKGROUND OF THE INVENTION

This invention relates generally to gas turbine engines and, more particularly, to the method of controlling the radial clearance between rotating and non-rotating parts thereof during variable speed and temperature operating conditions.

The invention herein described was made in the course of or under a contract, or subcontract thereunder, with the United States Department of the Air Force.

In an effort to maintain a high degree of efficiency, manufacturers of turbine engines have strived to maintain the closest possible clearance between the engine rotor and the surrounding stator structure, since any gas which may pass therebetween represents a loss of energy in the system. If the system were to operate only under steady-state conditions, it would be a simple matter to establish the desired close clearance relationship between the rotor and stator to obtain the greatest possible efficiency without allowing frictional interference between the elements. However, in reality, all turbine engines must initially be brought from a standstill condition up to a steady-state speed, and then eventually decelerate to the standstill condition. This transitional operation is not compatible with the ideal low clearance condition just described since the variation in rotor speed also causes growth thereof because of mechanical expansion caused by centrifugal forces. The stationary stator, of course, does not grow mechanically and there is, therefore, relative mechanical growth between the two structures during periods of transitional operation. Further, as the turbine engine is brought up to speed from a standstill condition, the temperature of the gas passing therethrough is increased proportionately, thereby exposing both the rotor and the stator to variable temperature conditions. These conditions cause thermal growth of the two structures and, if the two structures have different thermal coefficients of expansion, which is generally true, then there is also the occurrence of relative thermal expansion between the elements. Characteristically, a rotor is necessarily a large mass element which allows it to rotate at very high speeds, thereby inherently yielding a very slow thermal response (high thermal inertia). On the other hand, the stator is a stationary element and, preferably, has a high thermal response (low thermal inertia) to allow for thermal growth of the stator during periods of acceleration to accommodate the mechanical growth of the rotor during those periods.

Early turbomachines were designed to operate at relatively low speeds and low temperatures. The stationary shrouds were supported by structures bathed in cold air, and thereby exhibited a minimal amount of thermal growth and a slow temperature response to transients. The relative clearance between the rotor and the shroud was therefore determined by the radial growth of the rotor structure. But, since compressor-discharge air temperatures in the engine were relatively cool, and the turbomachinery ran at relatively low speeds, rotor growth due to temperature and centrifugal loading was moderate and therefore not a problem. Thus, proper clearance control between the relatively rotating parts was not considered to be a significant problem.

As the technology developed, and a single stage turbine was introduced, the operational speeds of the rotor, and the discharge temperature of the compressor were significantly increased. The resulting increased radial growth of the rotor, caused by centrifugal loading and thermal expansion, necessitated an accommodating growth of the shroud in order to maintain the proper radial clearances between the two parts. In order to accomplish this it was necessary to remove the cold bath from the support structure of the stationary shroud and to instead expose it to higher temperatures which allowed it to grow along with the rotor.

Since the efficiency and the wear life of the rotor and shroud portions of a gas turbine engine can be best optimized by operation at a particular radial clearance, the normal practice is to design the machine such that the desired clearance exists during maximum speed, steady-state operating conditions. As a consequence, however, during other periods of operation such as during transient operation, the clearance is less than the predetermined desired clearance. In order to accommodate this phenomenon by providing adequate clearance control during transients, a shroud support structure was preferably composed of a low-alpha material (having a low thermal coefficient of expansion), which in turn provided the required large cold clearances. However, with the use of the low-alpha material, relatively high clearances existed during part-power performance to thereby bring about reduced performance.

With the advent of gas turbine engines having still higher speeds and operating temperatures, the preferred low-alpha materials were found to be inadequate since they were not strong enough at high operating temperatures to ensure safe operation. The need for higher strength at higher temperatures called for the use of nickel-base alloys, whose coefficient of thermal expansion was characteristically higher than that of previously used metals. The nickel-base alloys gave adequate clearance control during maximum operating conditions and at part-power conditions, but the cold clearances between the rotating and non-rotating structures were thus reduced. And, during certain periods of transient operation, the clearances were reduced such that there was frictional contact established between the moving and non-moving parts, thereby resulting in wear and reduction of engine performance and efficiency. As is well known in the art, clearance between the two elements is at a minimum during periods of operation when the engine is decelerated to part power and then rapidly accelerated thereafter (hot rotor burst), and it is therefore this clearance which establishes the critical criteria for the design of an aircraft jet engine.

The problems associated with the maintenance of proper clearance between the turbine rotor and shroud apply equally as well to other relatively rotating parts of turbomachine. For example, throughout the length of a turbine engine there are various seal arrangements interposed between the moving and stationary parts of the engine to reduce or substantially prevent the axial flow of a motive fluid in the annular chamber defined by the two members. These seals are commonly provided between the rotating and non-rotating parts of the turbine and are referred to as static turbine seals. Another common seal is that used between the aft part of the rotating compressor and the circumscribing stationary casing, and is commonly known as the CDP (compressor discharge pressure) seal. These seals, with their associated stationary and rotating parts, are susceptible to the same phenomena as that of the shroud discussed hereinabove and efficiency and wear can be a problem when operating over a variable range of speeds and temperatures.

It is, therefore, an object of the present invention to provide a turbine engine which operates efficiently with desirable clearances over a wide range of speeds and temperatures.

It is also an object of the present invention to provide a turbine shroud structure which affords close clearance control at maximum and part-power, steady-state operating conditions.

It is a further object of the present invention to provide a turbine shroud structure which affords large cool clearances during low temperature operation and acceptable clearances during transient operation.

Yet another object of the present invention is to provide in a gas turbine engine a method for controlling the radial clearance between the rotating and nonrotating parts thereof during variable speed and temperature operating conditions.

These objects and other features and advantages become more readily apparent upon reference to the following description when taken in conjunction with the appended drawings.

SUMMARY OF THE INVENTION

Briefly, in accordance with one aspect of the invention, the shroud of a gas turbine engine is mounted and supported by way of a structure exhibiting two-alpha characteristics. That is, during exposure to a first predetermined lower temperature range the support structure exhibits a low coefficient of thermal expansion, while during exposure to a higher temperature range, it exhibits a second and substantially higher coefficient of thermal expansion. Thus, during low temperature operation of the turbine, there exists the desirable large cold clearances, and during high temperature operation thereof there is established a desirable close clearance relationship between the mating parts. Further, this dual-alpha characteristic of the support structure regulates the growth of the shroud in relation to that of the rotor such that close clearance is maintained during part-power operation while the clearances which exist during transient operations are maintained at an acceptable level.

By another aspect of the invention, the two-alpha material is used to support the stationary element of a rotating seal arrangement which is exposed to variable speed and temperature operating conditions. The clearance of the stationary and rotating elements is thus maintained at a desirable level to prevent excessive wear and to maintain efficient operation during these variable operating conditions. As an example, the stationary seal portion of the CDP (compressor discharge pressure) seal in a gas turbine engine is supported by such a two-alpha material to provide the desired clearance characteristics.

In the drawings as hereinafter described, the preferred embodiment is depicted; however, various other modifications and alternative constructions can be made thereto without departing from the true spirit and scope of the invention.

BRIEF DESCRIPTION OF THE DRAWINGS

FIG. 1 is a schematic representation of a gas turbine engine in which the present invention is embodied;

FIG. 2 is a partial, sectional view of a gas turbine engine showing the particular details of the present invention;

FIG. 3 is a graphic illustration of the two-alpha characteristics of the material in the present invention as compared with those of a typical one-alpha material; and FIG. 4 is a graphic illustration of the clearance relationship between the turbine blade tip and the shroud during variable speed and temperature operating conditions.

DESCRIPTION OF THE PREFERRED EMBODIMENT

Referring now to FIG. 1, a turbofan engine 10 is shown to include a fan rotor 11 and a core engine rotor 12. The fan rotor 11 includes a plurality of fan blades 13 and 14 mounted for rotation on a disc 16 and a low pressure or fan turbine 17, which drives the fan disc 16 in a well-known manner. Core engine rotor 12 includes a compressor 18 and a power or high pressure turbine 19 which drives the compressor 18. The core engine also includes a combustion system 21 which combines a fuel with the airflow and ignites the mixture to inject thermal energy into the system.

In operation, air enters the gas turbine engine 10 through an air inlet 22 provided by means of a suitable cowling or nacelle 23 which surrounds the fan rotor 11. Air entering the inlet 22 is compressed by means of the rotation of the fan blades 13 and 14 and thereafter is split between an annular passageway 24 defined by the nacelle 23 and an engine casing 26, and a core engine passageway 27 having its external boundary defined by the engine casing 26. The pressurized air which enters the core engine passageway 27 is further pressurized by means of the compressor 18 and thereafter ignited along with high energy fuel from the combustion system 21. This highly energized gas stream then flows through the high pressure turbine 19 to drive the compressor 18 and thereafter through the fan turbine 17 to drive the fan rotor disc 16. Gas is then passed out the main nozzle 28 to provide propulsion forces to the engine in a manner well known in the art. Additional propulsive force is gained by the exhaust pressurized air from the annular passage 24.

It should be noted that although the present description is given in terms of a turbofan aircraft engine, the present invention may be applicable to any gas turbine engine power plant such as that used for marine and industrial applications. The description of the engine shown in FIG. 1 is thus merely illustrative of the type of engine to which the present invention is applicable.

Referring now more specifically to that portion of the engine surrounding the combustion system 21, FIG. 2 shows the compressor 18 having stationary compressor stator vanes 29 and rotating rotor blades 31 which act to discharge high pressure air rearwardly toward the outlet guide vane 32. A portion of the CDP (compressor discharge pressure) air passes to the inner and outer sides of the inlet guide vanes and to the annular areas 33 and 34 where it is used for cooling purposes as will be more clearly recognized hereinafter. The principle portion of the CDP air passes the outlet guide vane 32, through the stepped diffuser 36 and into and around the combustion system 21.

The combustor 20 is comprised of outer and inner liners 37 and 38 disposed so as to mutually form an annular combustion chamber into which fuel is injected by way of a fuel nozzle 39 which extends inwardly through the combustion case 41. Cooling of the combustor 20 is partially attained by the flow of air from the diffuser into the annular passageway 35 defined by the combustor outer liner 37 and the combustion case wall 41. Similarly, on the inner side of the combustor an annular chamber 40 is defined by the inner liner 38 and the nozzle support structure 42 to cool that portion of the combustor. Following the mixture of fuel from the nozzle and air from the diffuser, and subsequent ignition of the mixture, the hot gases flow rearwardly from the combustion system 21 to a row of circumferentially spaced high pressure nozzles 43, and then further rearwardly to impinge on the circumferentially spaced row of turbine blades 44 of the high pressure turbine 19. Circumscribing the row of high pressure blades 44 in close clearance relationship therewith is an annular shroud 46 made of a suitable abradable material for closely surrounding the buckets but allowing some frictional engagement and wear at particular operational moments wherein the clearance between the shroud and blades may be temporarily lost. Shroud 46 is preferably made of a number of annular sectors attached at the inner side of an annular band 47 which is, in turn, made up of a number of sectors forming a complete circle. Structural support for the annular band 47 is provided by the shroud support member 48 having at its rearward end a radially inwardly extending collar which is attached to the annular band by way of a U-shaped bracket 49. The forward side of the annular band 47 is attached to the shroud support by way of a shroud hanger 50 and a plurality of bolts 51. The shroud support 48 is connected to the low pressure nozzle support 52 by bolts 53 at the rear end thereof, and to the combusition case 41 along with the high pressure nozzle support 56 by way of a plurality of bolts 57 spaced circumferentially around the casing.

As part of the cooling system, the combustion case 41 extends rearwardly around the high pressure turbine portion of the engine, where it is suddenly enlarged by the manifold portion 58 which forms an annular plenum 59 between the manifold and the shroud support 48. Fluidly connecting with the plenum 59 is a plurality of air bleed-off conduits 61 which carry bleed-off air from the intermediate stages of the compressor 18 for the purpose of turbine nozzle cooling in a manner well known in the art. Since the shroud support 48 is always exposed to the bleed-off air from the compressor, it is clear that the temperatures to which it is exposed is determinant on the speed of the engine. That is, at lower speeds the bleed-off air will be compressed to a lesser degree and will be relatively cool when it reaches the shroud support 48, whereas at higher speeds, the bleed-off air will be compressed to a greater degree and will be relatively hot when it reaches the shroud support 48. Of course, it will also be understood that the temperature of the shroud support will also be affected by the temperature of the gases emanating from the annular passageway 35 passing through holes in the high pressure nozzle support 56. It is then the combination of these two different air temperatures which determine the thermal growth pattern of the shroud support 48.

In accordance with this invention, both the shroud support 48 and the shroud hanger 50 are comprised of a material which exhibits a dual-alpha characteristic. That is, unlike most materials, the dual-alpha material exhibits one thermal coefficient of expansion when exposed to temperatures within a specified range, and another coefficient of thermal expansion when exposed to another range of temperatures. This characteristic can be more clearly seen by reference to FIG. 3 wherein the mean coefficient of thermal expansion is plotted as a function of temperature for two different kinds of such two-alpha materials, in comparison with the same characteristic of a typical high-alpha material. It will be recognized that for the single-alpha material the coefficient of thermal expansion does not vary significantly with temperature, and the variance thereof is characterized by a single slope of almost straight-line relationship. This high-alpha characteristic may cause mechanical interference between the blade and shroud during certain transient engine operation as will be more clearly shown hereinafter.

Referring now to material which exhibits a two-alpha characteristic, the graph $A_1$ indicates that for such a material exposed to temperatures between 300° and 650° F the coefficient of thermal expansion is very low and decreasing slightly with an increase in temperature. However, when the same material is exposed to temperatures from 650° to 1,400° F, the coefficient of thermal expansion increases significantly in almost direct proportion to increase in temperature. Similarly, a plot $A_2$ is shown for another of such two-alpha materials and is characterized by a negative slope within the range of 250° to 800° F and an almost straight line positive slope in the temperature range above 800° F. One example of such a two-alpha material is that known by the trade name Incoloy 903, which is made by the International Nickel Company Incorporated, and is available on a commercial basis. The use of such a two-alpha material in the shroud support structures, discussed hereinbefore, can be advantageous for maintaining desired clearances between the shroud and blade structures of a turbine engine during transient operation as will be seen by reference to FIG. 4.

FIG. 4 shows the clearance relationship between the turbine blade tip and the shroud for a sequence of operations, using three different types of material for the shroud support structure. Referring first to the graph of the high-alpha material it will be recognized that during periods of steady-state operation and at part-power conditions, the clearance relationship is substantial and adequate. However, during the period following the initial acceleration, the clearance relationship is reduced to an undesirable minimum as is shown at point A on the graph. Similarly, when there is a deceleration to part power, followed closely by a rapid acceleration, at point B on the graph, the clearance can also be reduced to an undesirable minimum wherein the material may be removed from either the rotating or the non-rotating parts.

When using a support metal characterized by the coefficient of thermal expansion as that shown by $A_1$ in FIG. 3, the clearance relationship between the blade tip and shroud clearance is as indicated in graph as $P_1$ in FIG. 4. It will be recognized that in addition to maintaining desired clearances during steady-state and part-power operating conditions, there is also substantial clearance relationship immediately following acceleration and, more importantly, the clearance during the period immediately following deceleration and preceding acceleration, is substantial as shown by point C on the graph. Likewise, the graph $P_2$ indicates the clearance relationship when using another two-alpha material which is characterized by the coefficient of thermal expansion $A_2$ relationship of FIG. 3. Again, the clearance appears to be substantial and adequate during periods immediately following acceleration and also during the period between a deceleration and the sudden acceleration (point D). Therefore, it can be seen that with the use of either of the two-alpha materials characterized by $A_1$ or $A_2$, the steady-state clearance can be established at the same desired level as that with the one-alpha material, and in addition the transient clearances can be established as desired. The particular type of two-alpha material which is used will depend on the desired characteristics of the user and can be appropriately chosen to exhibit the particular characteristics to establish any desired transient clearance relationship between or near the graphs of $P_1$ and $P_2$.

It should be kept in mind that the use of the two-alpha material as a support structure can also be made at locations in the engine other than that of the turbine shroud. In particular, the material can be used effectively to support the stationary member of a seal, in either the turbine or the compressor area, to obtain desirable clearance characteristics.

Referring again to FIG. 2, it will be remembered that the hot expanded gases passing from the combustor system 21 pass through the turbine nozzles 43 and turbine blades 44 in a high pressure state. At the same time, on the radially inner side of the buckets and turbines, there is a circulation of cooling air to maintain the temperatures of the components at an acceptable temperature level. Coolant air originates in the annular chamber 40 surrounding the combustor and passes through the aperture 63 and into the annular manifold 64. From the manifold it passes rearwardly through the stationary expander nozzle 66 and into the cavity 67. Extending into the cavity 67 is a turbine seal disc 68, on the end of which is disposed a toothed seal 69 of a type well known in the art. The coolant air flows from cavity area 67 on one side of the turbine seal disc 68 and through the disc hole 71 into a chamber 72 on the other side thereof. It is a function of the seal 69 to maintain the pressure drop between the high pressure coolant air and that of the hot turbine gases at the outer side. The rotating toothed seal 69 mates with the stationary seal seat 73 which is comprised of a soft, temperature-resistant material. The seal seat 73 is supported by a seal support bracket 74 which, in turn, is connected to the turbine structure by way of bolts 76, 77. In accordance with the present invention the seal support bracket 74 is comprised of a two-alpha material as described hereinbefore to obtain desired clearance relationships between the seal seat 73 and the toothed seal 69 during periods of steady-state and transient operation.

Referring now to the rear portion of the compressor 18, wherein compressed air passes into the outlet guide vane 32, it was mentioned hereinbefore that a portion of the compressed air passes into the annular space 33. At this point, the interface between the rotating core rotor 12 and the stationary outlet vane and diffuser assembly is established by the CDP (compressor discharge pressure) seal 78. The CDP seal 78 is a toothed seal of a type well known in the art and is surrounded in close fit relationship by a stationary seal seat 79 to establish the proper pressure drop at that interface point. The stepped stationary seal seat 79 is rigidly attached to a support bracket 81 which is attached by way of bolts 82 to the nozzle support structure 42. Again, the support bracket 81 is comprised of a two-alpha material of the type discussed hereinbefore to exhibit the desired thermal growth characteristics to maintain proper clearance relationships between the CDP seal 78 and seal seat 79.

It should be recognized that the present invention has been described in terms of relatively rotating parts, with the stationary outer part being composed of a two-alpha material. However, one skilled in the art will readily see that the subject invention is not limited to this particular arrangement. For example, the present invention could be adapted for use in an arrangement wherein the outer element is rotating and the inner element is stationary, or it may be that each of the elements is rotating at different speeds to thereby establish a relative speed therebetween.

What is claimed is:

1. An improved turbomachine of the type having relatively rotating parts adapted for exposure to variable speed and temperature operating conditions, wherein the improvement comprises:
   a. a rotatable member having a relatively high thermal inertia;
   b. a relatively stationary member having a relatively low thermal inertia and disposed in close radial relationship with said rotatable member; and
   c. a support structure for said stationary member comprised of a material having a coefficient of thermal expansion curve which exhibits a descending characteristic over a first predetermined temperature range and an ascending characteristic over a second higher predetermined temperature range.

2. An improved turbomachine as set forth in claim 1 wherein said relatively stationary member circumscribes said rotatable member.

3. An improved turbomachine as set forth in claim 1 wherein said rotatable member comprises a turbine rotor and said relatively stationary member comprises surrounding stator structure.

4. An improved turbomachine as set forth in claim 1 wherein said coefficient of thermal expansion curve remains below $5.0 \times 10^{-6}$ in./in. °F over said first predetermined temperature range.

5. An improved turbomachine as set forth in claim 1 wherein said material is characterized by the ability to be exposed to temperatures in excess of 1,000° F without any substantial resultant loss in strength.

6. An improved turbomachine as set forth in claim 1 wherein said coefficient of expansion curve changes slope by an amount greater than 15° over a predetermined 200° F temperature range.

* * * * *